(12) United States Patent
Takahashi et al.

(10) Patent No.: US 9,058,784 B2
(45) Date of Patent: Jun. 16, 2015

(54) LIQUID CRYSTAL DISPLAY DEVICE

(75) Inventors: Masayuki Takahashi, Osaka (JP);
Akihiko Inoue, Osaka (JP); Osamu Teranuma, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 374 days.

(21) Appl. No.: 13/699,396

(22) PCT Filed: Feb. 8, 2011

(86) PCT No.: PCT/JP2011/052633
§ 371 (c)(1),
(2), (4) Date: Nov. 21, 2012

(87) PCT Pub. No.: WO2011/148676
PCT Pub. Date: Dec. 1, 2011

(65) Prior Publication Data
US 2013/0076864 A1    Mar. 28, 2013

(30) Foreign Application Priority Data

May 28, 2010    (JP) ................................. 2010-123459

(51) Int. Cl.
*H04N 13/04* (2006.01)
*H04N 13/00* (2006.01)
(Continued)

(52) U.S. Cl.
CPC .............. *G09G 3/3611* (2013.01); *G09G 3/003* (2013.01); *G09G 2320/0209* (2013.01);
(Continued)

(58) Field of Classification Search
CPC .......... H04N 13/0055; H04N 13/0452; H04N 13/0497; H04N 2013/0465; H04N 2013/0463; H04N 3/127; G06T 7/0022; G06T 7/0075; G06T 2207/10012; G06T 2207/10016; G06T 2207/10021; G09G 3/18
USPC ............... 348/46, 42, 51, 790–793, 674, 675; 345/419, 6, 38, 50, 87–89; 382/154

IPC ............. H04N 13/02,13/00, 13/04, 5/202, 9/69, H04N 3/14, 9/30
See application file for complete search history.

(56) References Cited

U.S. PATENT DOCUMENTS 8,638,359 B2 *    1/2014    Kim et al. .......................... 348/51
8,902,297 B2 *    12/2014    Park et al. ......................... 348/51
(Continued)

FOREIGN PATENT DOCUMENTS

CN        101345038 A        1/2009
JP        1-272286        10/1989
(Continued)

OTHER PUBLICATIONS

International Search Report and Written Opinion mailed Mar. 8, 2011, directed towards International Application No. PCT/JP2011/052633; 7 pages.
(Continued)

*Primary Examiner* — Sherrie Hsia
(74) *Attorney, Agent, or Firm* — Morrison & Foerster LLP (57) ABSTRACT

A liquid crystal display device for carrying out a 3D display by a frame sequential method as well as a 2D display includes: a digital γ correction section for changing an input gray level to a gamma characteristic corresponding to either the 2D display or the 3D display in accordance with a preset analog gamma value; an overdrive circuit for finding, in accordance with a parameter set according to the gamma characteristic thus corrected by the digital γ correction section, an overdrive value corresponding to the input gray level; and an analog γ correction section for finding a voltage value to be applied to liquid crystal by correcting the overdrive value found by the overdrive circuit. In the digital γ correction section, an analog gamma value for the 3D display is set to be larger than an analog gamma value for the 2D display.

3 Claims, 8 Drawing Sheets

(51) Int. Cl.
*H04N 3/14* (2006.01)
*H04N 9/69* (2006.01)
*G09G 3/36* (2006.01)
*G09G 3/00* (2006.01)

(52) U.S. Cl.
CPC ............... *G09G 2320/0252* (2013.01); *G09G 2320/0673* (2013.01); *H04N 13/0438* (2013.01); *H04N 13/0452* (2013.01); *H04N 13/0422* (2013.01)

(56) References Cited

U.S. PATENT DOCUMENTS

| | | |
|---|---|---|
| 2009/0009508 A1 | 1/2009 | Koo et al. |
| 2009/0244387 A1 | 10/2009 | Lee et al. |
| 2010/0033555 A1 | 2/2010 | Nagase et al. |
| 2010/0039503 A1 | 2/2010 | Lin et al. |
| 2010/0309381 A1 | 12/2010 | Nakagawa et al. |
| 2010/0328426 A1 | 12/2010 | Matsubara |

FOREIGN PATENT DOCUMENTS

| | | |
|---|---|---|
| JP | 6-165205 | 6/1994 |
| JP | 7-66992 | 3/1995 |
| JP | 10-276456 | 10/1998 |
| JP | 2003-259395 | 9/2003 |
| JP | 2010-282089 | 12/2010 |
| JP | 2011-15011 | 1/2011 |

OTHER PUBLICATIONS

Extended European Search Report dated Feb. 3, 2014, directed to EP Application No. 11786376.1; 3 pages.

* cited by examiner

| 2D MODE | 0 | 1 | 2 | 3 | 4 | 5 | 6 | 7 |
|---|---|---|---|---|---|---|---|---|
| 0 | 0 | 4 | 8 | 12 | 16 | 20 | 24 | 28 |
| 8 | 32 | 36 | 40 | 44 | 48 | 52 | 56 | 60 |
| 16 | 64 | 68 | 72 | 76 | 80 | 84 | 88 | 92 |
| 24 | 96 | 100 | 104 | 108 | 112 | 116 | 120 | 124 |
| 32 | 128 | 132 | 136 | 140 | 144 | 148 | 152 | 156 |
| 40 | 160 | ... | ... | ... | ... | ... | ... | ... |

| 3D MODE | 0 | 1 | 2 | 3 | 4 | 5 | 6 | 7 |
|---|---|---|---|---|---|---|---|---|
| 0 | 0 | 15 | 25 | 35 | 43 | 51 | 59 | 66 |
| 8 | 74 | 80 | 87 | 94 | 100 | 106 | 113 | 119 |
| 16 | 125 | 131 | 136 | 142 | 148 | 153 | 159 | 164 |
| 24 | 170 | 175 | 180 | 186 | 191 | 196 | 201 | 206 |
| 32 | 211 | 216 | 221 | 226 | 231 | 236 | 241 | 246 |
| 40 | 250 | ... | ... | ... | ... | ... | ... | ... |

LIQUID CRYSTAL DISPLAY DEVICE

REFERENCE TO RELATED APPLICATIONS

This application is a national stage application under 35 USC 371 of International Application No. PCT/JP2011/052633, filed Feb. 8, 2011, which claims priority from Japanese Patent Application No. 2010-123459 filed May 28, 2010, the entire contents of which are incorporated herein by reference.

FIELD OF THE INVENTION

The present invention relates to a liquid crystal display device capable of switching between a 2D (two-dimensional) display and a 3D (three-dimensional) display.

BACKGROUND OF THE INVENTION

In recent years, a liquid crystal display capable of a 3D display as well as a 2D display has been developed. Such a liquid crystal display is generally configured to be capable of switching between a 2D display and a 3D display, in order to carry out the 3D display while maintaining an ability to carry out the 2D display which is a conventional display mode.

In a case where a liquid crystal display is used with a television receiver, gamma correction is carried out so that a gamma characteristic of the liquid crystal display is close to that of a CRT (cathode ray tube), as disclosed in Patent Literature 1. It is needless to say that the gamma correction is carried out also in a liquid crystal display configured to be capable of switching between a 2D display and a 3D display.

Japanese Patent Application Publication, Tokukaihei, No. 6-165205 A (Published on Jun. 10, 1994)

SUMMARY OF THE INVENTION

In a case where a liquid crystal display is used with a television receiver, usually gamma correction is carried out so that the liquid crystal display has a gamma value of 2.2, which is close to that of a CRT.

Generally, gamma correction for a liquid crystal display is based on a combination of analog gamma correction and digital gamma correction. That is, the gamma correction for a liquid crystal display is made up of (i) analog gamma correction for rough correction and (ii) digital gamma correction for fine adjustment. However, this causes the following problem. Assume that a 2D display and a 3D display are carried out by a liquid crystal display whose analog gamma value is controlled to be 2.2. Although no problem occurs when the 2D display is carried out, display quality of the 3D display may decrease depending on how the 3D display is carried out.

Figure 8:
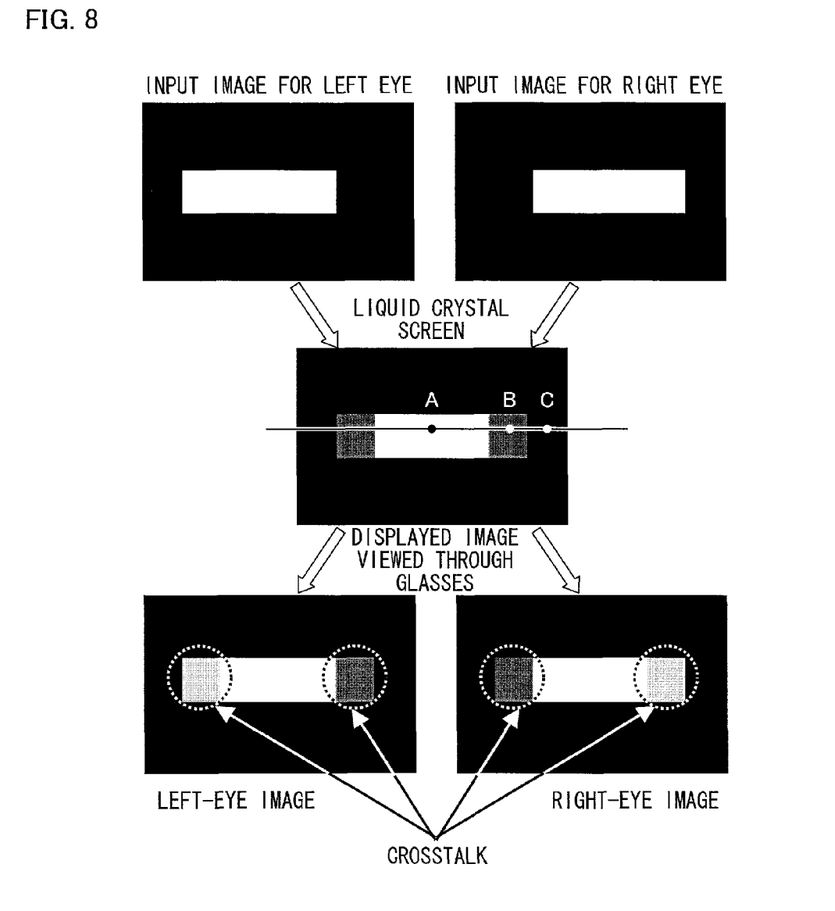
FIG. 8 is a view showing a problem during a 3D display when a conventional liquid crystal display device is used.

For example, in a case where 3D display is carried out by a frame sequential method, a phenomenon called "crosstalk" occurs, which causes two or three overlapping images and reduces display quality. The crosstalk is such that a right-eye input image is mixed into a left-eye input image (or vice versa) as shown in FIG. 8.

Figure 9:
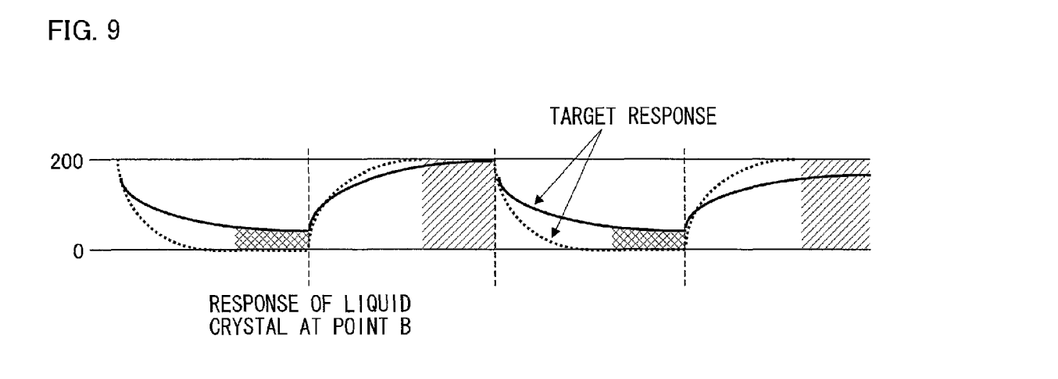
FIG. 9 is a view describing a reason of the problem shown in FIG. 8.

The crosstalk seems to occur partly because of the following reason. Due to its slow response speed, liquid crystal cannot properly respond when it displays a left-eye image after having displayed a right-eye image. Accordingly, the right-eye image leaves some effect and is mixed into the left-eye image (see FIG. 9).

In view of the circumstances, overdrive is carried out in order to increase the response speed of liquid crystal. The overdrive is a driving method by which to temporarily apply a voltage that has a value higher or lower than a predetermined value to liquid crystal.

Figure 2:
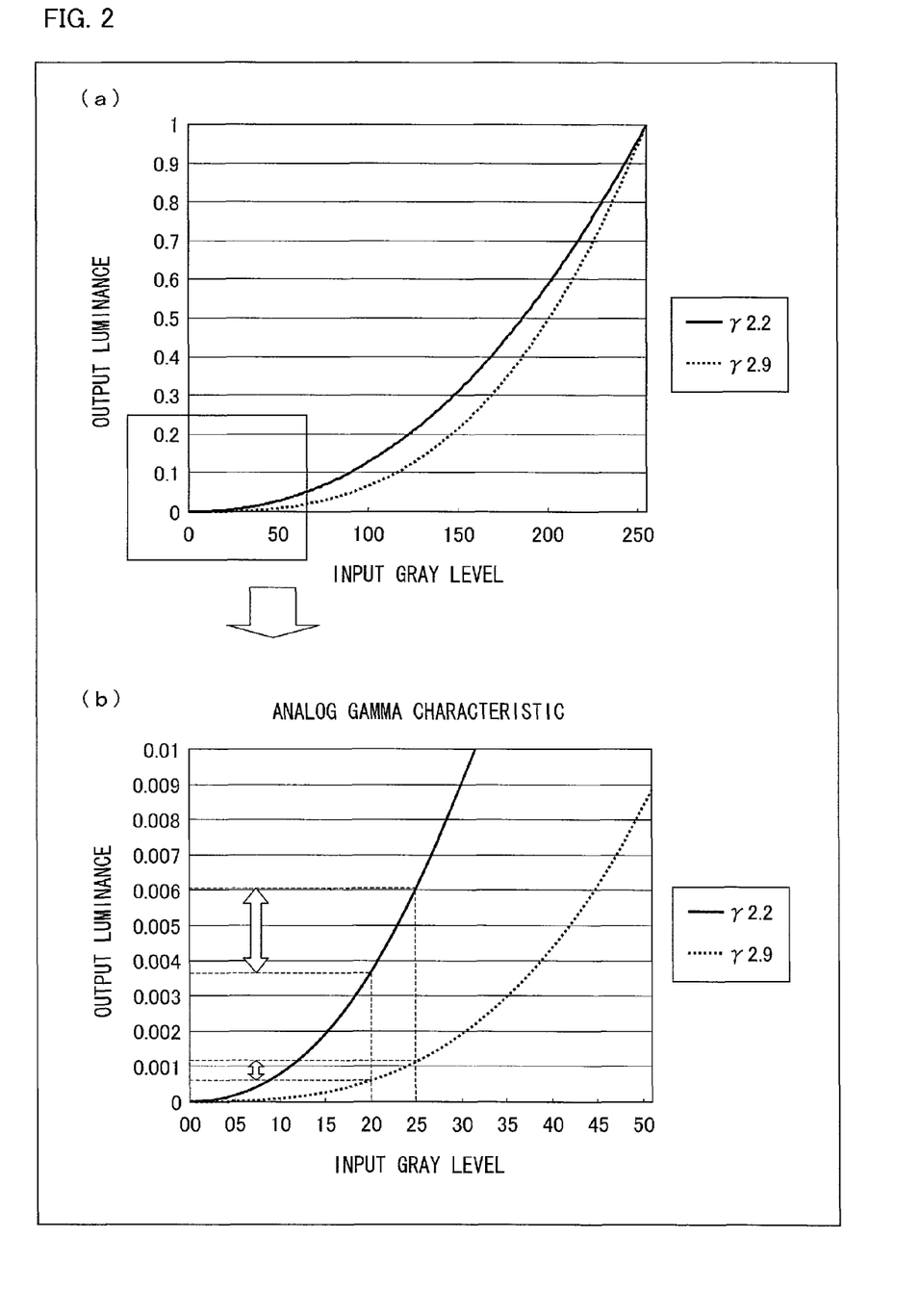

Note however that, in a case where an analog gamma value is 2.2, the following occurs. As is clear from for example the gamma characteristics shown in (a) and (b) of FIG. 2, a change of an output value relative to a change of an input gray level is greater in the case of the analog gamma value 2.2. This is noticeable on the low gray level side. Therefore, as shown in for example (a) of FIG. 4, it is not possible to set, in small increments, parameters (hereinafter referred to as OD parameters) for use in overdrive on the low gray level side. Therefore, the parameters deviate from theoretical values. That is, liquid crystal cannot reach a desired gray level, and thus afterimages overlap. This results in crosstalk. In other words, crosstalk occurs due to an improper overdrive process on the low gray level side at the time of the 3D display, and significantly reduces display quality.

The present invention has been made in view of the above problem, and an object of the present invention is to provide a liquid crystal display device capable of displaying, when carrying out a 3D display by a frame sequential method, a high-quality image in which no crosstalk occurs.

In order to attain the above object, a display device in accordance with the present invention is a liquid crystal display device for carrying out a 3D display by a frame sequential method as well as carrying out a 2D display, wherein: an analog gamma value for the 3D display is set to be larger than an analog gamma value for the 2D display.

According to the configuration, since the analog gamma value for the 3D display is set to be larger than the analog gamma value for the 2D display, a gamma curve for the 3D display on the low gray level side rises more gently than that for the 2D display.

This makes it possible to set, on the low gray level side, luminance values corresponding to input gray levels in smaller increments for the 3D display than for the 2D display. Therefore, it is possible to set for example values of OD parameters (voltage values), which are for use in an overdrive process, in small increments. That is, it is possible to reduce differences between the OD parameters and theoretical values, and thus possible to carry out an overdrive process with appropriate OD parameters on the low gray level side.

As such, it is possible to prevent crosstalk caused by an improper overdrive process on the low gray level side at the time of 3D display, and thus possible to display a high-quality image.

A liquid crystal display device of the present invention is a liquid crystal display device for carrying out a 3D display by a frame sequential method as well as carrying out a 2D display, including: a first gamma correction section for changing an input gray level to a gamma characteristic that corresponds to either the 2D display or the 3D display in accordance with a preset analog gamma value; a second gamma correction section for correcting a gamma characteristic so that a total gamma characteristic for the 3D display is substantially equal to a total gamma characteristic for the 2D display; and an overdrive circuit for finding, in accordance with a parameter set according to the gamma characteristic thus corrected by the second gamma correction section, an overdrive value corresponding to the input gray level, in the first gamma correction section, an analog gamma value for the 3D display being set to be larger than an analog gamma value for the 2D display.

According to the configuration, since the analog gamma value for the 3D display is set to be larger than the analog gamma value for the 2D display in the first gamma correction section, a gamma curve for the 3D display on the low gray level side rises more gently than that for the 2D display.

This makes it possible to set, on the low gray level side, luminance values corresponding to input gray levels in smaller increments for the 3D display than for the 2D display. Therefore, it is possible to set for example values of OD parameters (voltage values), which are for use in the overdrive circuit, in small increments. That is, it is possible to reduce differences between the OD parameters and theoretical values, and thus possible to carry out an overdrive process with appropriate OD parameters on the low gray level side.

As such, it is possible to prevent crosstalk caused by an improper overdrive process on the low gray level side at the time of 3D display, and thus possible to display a high-quality image.

A liquid crystal display device of the present invention is a liquid crystal display device for carrying out a 3D display by a frame sequential method as well as carrying out a 2D display, wherein an analog gamma value for the 3D display is set to be larger than an analog gamma value for the 2D display. This makes it possible to prevent crosstalk caused by an improper overdrive process on the low gray level side at the time of the 3D display, and thus possible to display a high-quality image.

BRIEF DESCRIPTION OF THE DRAWINGS

(a) of FIG. 2 is a graph showing an analog gamma characteristic. (b) of FIG. 2 is an enlarged view of the low gray level side of (a) of FIG. 2.

(a) of FIG. 4 is a graph showing a relationship between initial gray levels and overdrive values when the analog gamma is 2.2. (b) of FIG. 4 is a graph showing a relationship between initial gray levels and overdrive values when the analog gamma is 2.9.

DETAILED DESCRIPTION OF THE INVENTION

The following description discusses one embodiment of the present invention.

The present embodiment discusses a liquid crystal display device capable of switching between a 2D (two-dimensional) display and a 3D (three-dimensional) display.

According to the liquid crystal display device, an image to be displayed is given a three-dimensional appearance by a frame sequential method (time-division driving method), i.e., by switching between displaying of a right-eye image and displaying of a left-eye image for every single frame. In the following description, a display mode in which a 2D display is carried out is referred to as a 2D display mode, and a display mode in which a 3D display is carried out is referred to as a 3D display mode.

Figure 1:
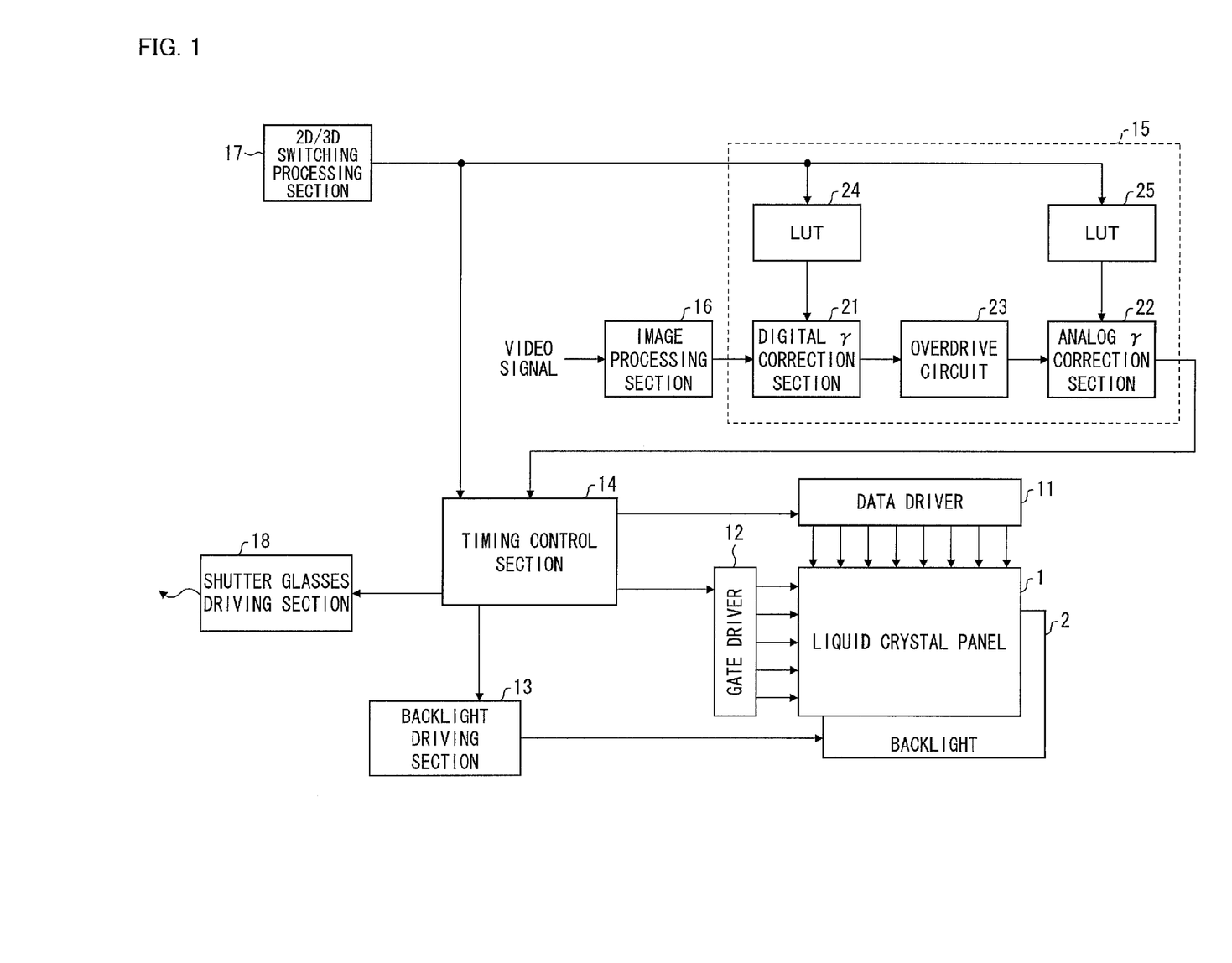
FIG. 1 is a block diagram schematically illustrating a configuration of a liquid crystal display device in accordance with an embodiment of the present invention.

As illustrated in FIG. 1, a liquid crystal display device includes (i) a liquid crystal panel 1, (ii) a backlight 2 which backlights the liquid crystal panel 1, (iii) a data driver 11 and a gate driver 12 serving as driving circuits for driving the liquid crystal panel 1, (iv) a backlight driving section 13 serving as a driving circuit for driving the backlight 2, (v) a timing control section 14 which generates timing control signals to control timings of driving of these driving circuits, (vi) a signal processing section 15 which supplies a video signal to the timing control section 14, and (vii) an image processing section 16 which supplies, to the signal processing section 15, a video signal to be processed.

The liquid crystal display device further includes (viii) a 2D/3D switching processing section 17 which generates and outputs various instruction signals for switching between the 2D display mode and the 3D display mode and (ix) a shutter glasses driving section 18 for controlling opening and closing of shutters of a pair of active shutter glasses (not illustrated) for use in the 3D display mode.

The liquid crystal panel 1 is constituted by two glass substrates between which a liquid crystal material is sandwiched, and includes a plurality of pixels. A polarizer (not illustrated) is bonded to a surface of each of the two glass substrates on the front and back sides.

The liquid crystal panel 1 is configured to display an image based on a video signal. The liquid crystal panel 1 displays the image by modulating light from the backlight 2 in response to a drive signal supplied from the gate driver 12 on the basis of a drive voltage supplied from the data driver 11.

The backlight 2 is a light source for irradiating the liquid crystal panel 1 with light, and is constituted by, for example, a cold cathode fluorescent tube (CCFL) or an LED (light emitting diode). In order for the liquid crystal display panel 1 to carry out a 3D display, backlight scanning (described later) is necessary. Therefore, the light source used here is constituted by LEDs.

The data driver 11 converts received data (data obtained by subjecting a video signal to certain processing) into a voltage value in response to a timing signal from the timing control section 14, and supplies drive voltages to the pixels of the liquid crystal panel 1. Meanwhile, the gate driver 12 sequentially turns ON/OFF the gates of TFTs (thin film transistors) of the liquid crystal panel 1 in response to a timing signal from the timing control section 14. This causes a desired voltage corresponding to the video signal to be applied to the pixels of the liquid crystal panel 1.

The backlight driving section 13 drives the backlight 2 to turn on/off the LEDs which constitute the backlight 2, in response to a timing signal from the timing control section 14. The backlight driving section 13 controls the backlight 2 to turn on/off the LEDs so as to carry out the aforementioned backlight scanning.

The timing control section 14 controls timings of driving of the data driver 11 and the gate driver 12, and supplies, to the data driver 11 and the gate driver 12, video data received from the signal processing section 15. The timing control section 14 further controls timings of (i) scanning of the backlight 2 and (ii) driving of the pair of active shutter glasses (not illustrated) while a 3D display is carried out.

The pair of active shutter glasses is provided with shutters in both right and left parts of its frame, and is configured such that the shutters are driven independently from each other. The shutters are driven in response to a drive signal from the shutter glasses driving section 18.

The shutter glasses driving section 18 supplies a drive signal to the pair of active shutter glasses, in response to a timing signal from the timing control section 14. Such a drive signal is generally carried by an infrared ray.

The signal processing section 15 is configured to (i) carry out gamma correction and an overdrive process with respect to a video signal having been subjected to image processing by the image processing section 16 and (ii) supply obtained video data to the timing control section 14. The signal processing section 15 includes a digital γ correction section (a second gamma correction section) 21, an analog γ correction section (a first gamma correction section) 22, an overdrive circuit 23, a LUT 24, and a LUT 25. The signal processing section 15 is described later in detail.

The image processing section 16 carries out, with respect to a video signal that it received, image processing such as color tinge correction, color tone correction, gray level correction and noise removal. The image processing section 16 then converts the video signal for a 3D display, such as frame packing or side-by-side, into a video signal for a frame sequential method. The video signal thus obtained through the image processing by the image processing section 16 is supplied to the subsequent signal processing section 15.

The video signal supplied to the image processing section 16 here is for example a video signal (broadcasting signal) received by a tuner (not illustrated) or a video signal from a VTR (video tape recorder) or from various players.

The 2D/3D switching processing section 17 generates an instruction signal for changing gamma correction that is to be carried out by the signal processing section 15, in response to (i) switching between the 2D display mode and the 3D display mode by a user or (ii) a 2D/3D display mode switching signal generated automatically in accordance with a mode identification signal etc. which is included in a video signal that the 2D/3D switching processing section 17 receives. Then, the 2D/3D switching processing section 17 outputs the instruction signal. Specifically, the 2D/3D switching processing section 17 generates an instruction signal for selecting LUTs of the LUT 24 of the digital γ correction section 21 and the LUT 25 of the analog γ correction section 22, which LUTs correspond to a selected display mode, and supplies the instruction signal to the signal processing section 15. Meanwhile, the 2D/3D switching processing section 17 also supplies, to the timing control section 14, an instruction signal for changing the timing of turning-on of the backlight 2 to a timing corresponding to the selected display mode.

The following description discusses the signal processing section 15 in detail.

As described earlier, the signal processing section 15 includes the digital γ correction section 21, the overdrive circuit 23, the analog γ correction section 22, the LUT 24, and the LUT 25.

Note here that gamma correction is carried out by two sections: the digital γ correction section 21 and the analog γ correction section 22. A total gamma characteristic means overall gamma characteristics corrected by the two respective γ correction sections.

The digital γ correction section 21 corrects a gamma characteristic so that a total gamma characteristic for a 3D display is substantially equal to that for a 2D display. In other words, the digital γ correction section 21 changes a gamma characteristic by converting a received gray level with reference to the LUT 24. Note here that a gamma characteristic to be achieved by the change is different between the 2D display mode and the 3D display mode. Specifically, an analog gamma value for the 3D display mode (for 3D display) is set to be larger than that for the 2D display mode (for 2D display).

The analog gamma characteristic is set by the analog γ correction section (described later). Specifically, the analog gamma characteristic is set so as to be (i) a gamma curve which represents a gamma value of 2.2 in the 2D display mode and (ii) a gamma curve which represents a gamma value of 2.9 in the 3D display mode (see (a) and (b) in FIG. 2).

Note here that the "substantially equal" as used in the phrase "corrects a gamma characteristic so that a total gamma characteristic for a 3D display is substantially equal to that for a 2D display" indicates that both values do not necessarily have to be exactly the same, and therefore can be different from each other to some extent. For example, the total gamma characteristic for the 3D display and that for the 2D display can be set as appropriate, provided that the object of the present invention (high-quality display image with no crosstalk can be obtained when a 3D display is carried out by a frame sequential method) is achieved. In order to increase display quality, it is preferable to set the total gamma characteristics for the 3D display and for the 2D display to the same value.

The digital γ correction section 21 carries out digital gamma correction so that the total gamma characteristic has a gamma value of 2.2. That is, the digital γ correction section 21 carries out digital gamma correction so that the total gamma characteristic for the 3D display and the total gamma characteristic for the 2D display each have a gamma value of 2.2. Assume here that a correction value for obtaining a gamma value 2.2 of the total gamma characteristic is referred to as a digital gamma value. In the 2D display mode, since the gamma value of the analog gamma characteristic is 2.2, the digital gamma value is 2.2/2.2=1. In the 3D display mode, since the gamma value of the analog gamma characteristic is 2.9, the digital gamma value is 2.2/2.9≈0.759. This shows that the digital gamma value for the 3D display mode is set to be shallower (smaller: approximately 0.759) than that for the 2D display mode (approximately 1).

Figure 3:
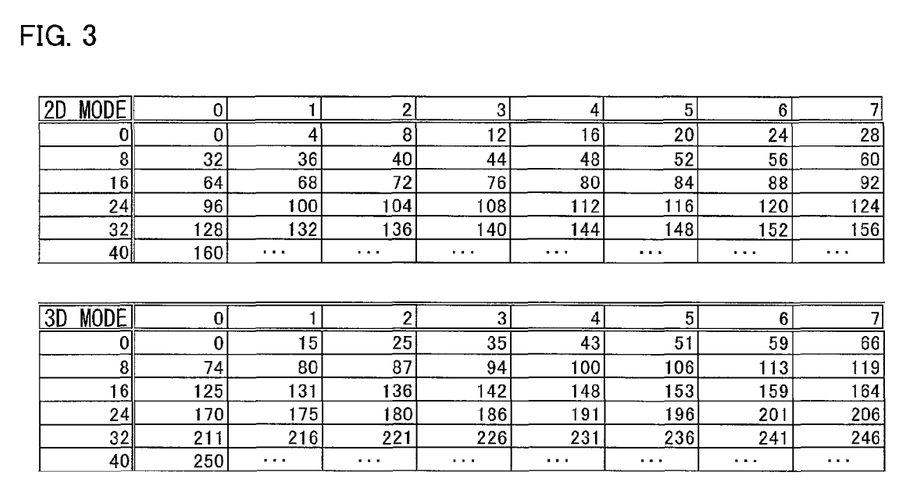
FIG. 3 shows lookup tables for a 2D display mode and a 3D display mode, respectively, used in a digital γ correction section of the liquid crystal display device shown in FIG. 1.

The digital gamma correction for this setting is carried out with reference to the LUT 24 as described earlier. The LUT 24 includes different LUTs for the 2D display mode and for the 3D display mode, respectively (see for example the tables shown in FIG. 3). In the LUT 24, an LUT that corresponds to a display mode selected by the instruction signal from the 2D/3D switching processing section 17 is in a selected state, and the LUT in the selected state is referenced by the digital γ correction section 21. Note that, since the tables shown in FIG. 3 are represented by 10 bits, for example, a value that corresponds to a gray level 16 is 64 for the 2D display mode and 125 for the 3D display mode.

The overdrive circuit 23 is provided between the digital γ correction section 21 and the analog γ correction section 22. The overdrive circuit 23 calculates an overdrive amount from a gray level for a previous frame and a gray level for a current frame, and outputs the overdrive amount.

Figure 4:
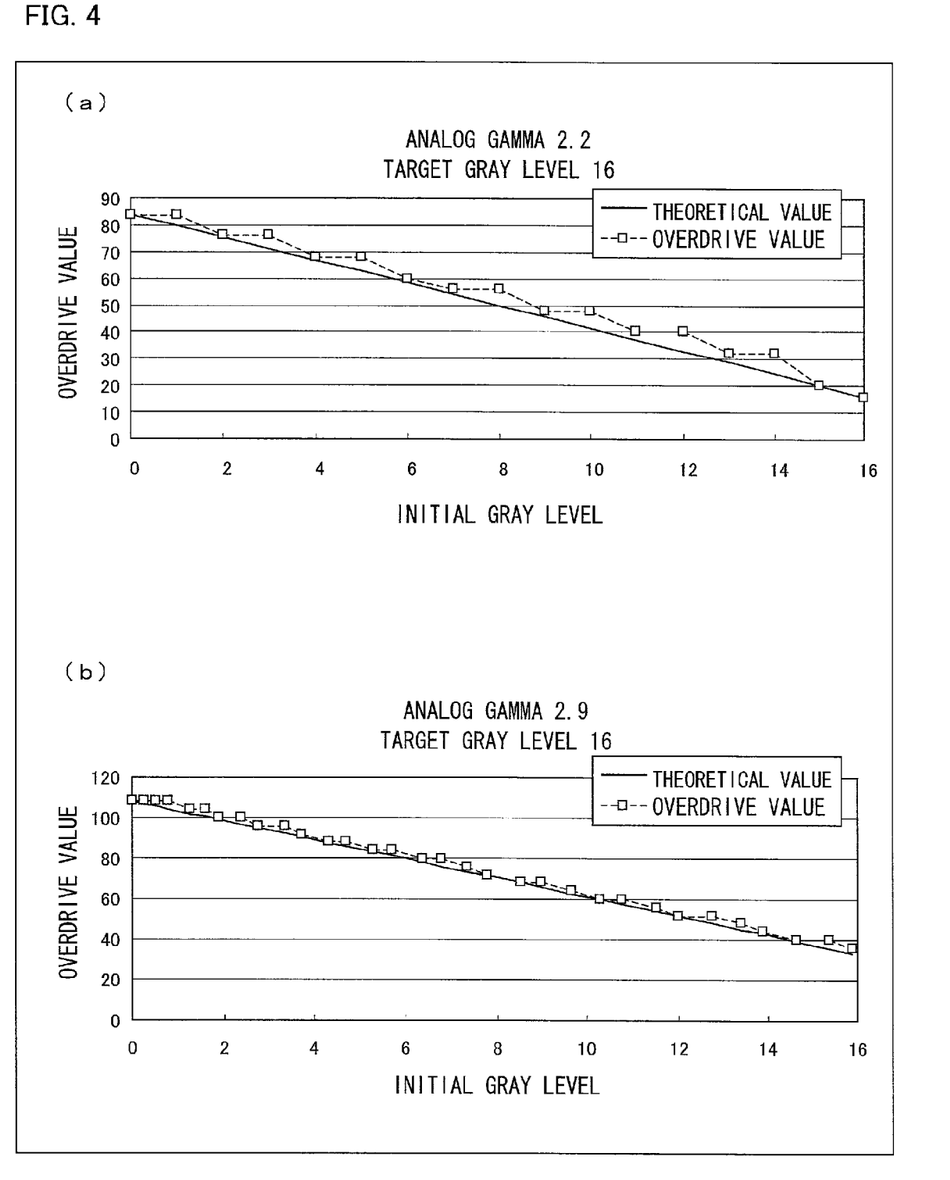

(a) and (b) of FIG. 4 show overdrive parameters (hereinafter referred to as OD parameters) for finding an overdrive amount (value) on the low gray level side.

Specifically, an overdrive value is found from an initial gray level (gray level for a previous frame) and a target gray level (gray level for a current frame) as shown in (a) and (b) of FIG. 4. (a) of FIG. 4 is a graph showing a relationship between initial gray levels and overdrive values when the analog gamma value is 2.2. (b) of FIG. 4 is a graph showing a relationship between initial gray levels and overdrive values when the analog gamma value is 2.9. The graphs shown in (a) and (b) of FIG. 4 are represented by 8 bits. Therefore, a value that corresponds to a gray level 16 for the 2D display mode and a value that corresponds to a gray level 16 for the 3D display mode are 16 and 31, respectively, in 8 bits. In other words, the overdrive value for a target gray level 16 is 16 in the 2D display mode and 31 in the 3D display mode.

The overdrive circuit 23 finds an overdrive value corresponding to an input gray level that has been subjected to digital gamma correction in the digital γ correction section 21, and supplies the overdrive value to the subsequent analog γ correction section 22. The overdrive circuit 23 finds the overdrive value with use of (i) an OD parameter shown in (a) of FIG. 4 in the case of the 2D display mode and (ii) an OD parameter shown in (b) of FIG. 4 in the case of the 3D display mode.

Usually, according to an overdrive process, not 10-bit data but 8- or 7-bit data is processed as described above, for cost reduction (mainly for saving memory). This causes a problem in which an actual overdrive value is significantly different from a theoretical overdrive value. The difference is large particularly on the low gray level side. It is clear from (a) and (b) of FIG. 4 that the difference is smaller when the gamma value is 2.9 (see (b) of FIG. 4) than when the gamma value is 2.2 (see (a) of FIG. 4).

As has been described, the overdrive circuit 23 finds an overdrive value with use of an OD parameter corresponding to a display mode and supplies the overdrive value to the subsequent analog γ correction section 22.

The analog γ correction section 22 changes, in accordance with a preset analog gamma value, an input gray level to a gamma characteristic that corresponds to the 2D display or the 3D display. In other words, the analog γ correction section 22 corrects an analog gamma of each gray level by adjusting, with reference to the LUT 25, a voltage to be applied to liquid crystal.

Specifically, the analog γ correction section 22 finds the value of a voltage to be applied to liquid crystal, by correcting, with reference to the LUT 25, the overdrive value supplied from the overdrive circuit 23. In other words, this process determines an analog gamma characteristic.

Note here that, in the LUT 25, a LUT that corresponds to a display mode indicated by the instruction signal from the 2D/3D switching processing section 17 is in a selected state, and is referenced by the analog correction section 22. Note here that, as described earlier, a gamma characteristic to be achieved by the change is different between the 2D display mode and the 3D display mode. Specifically, an analog gamma value for the 3D display mode (for 3D display) is set to be larger than an analog gamma value for the 2D display mode (for 2D display).

The following description discusses a timing of a display carried out by the liquid crystal panel 1 and a timing of scanning of the backlight 2.

Figure 5:
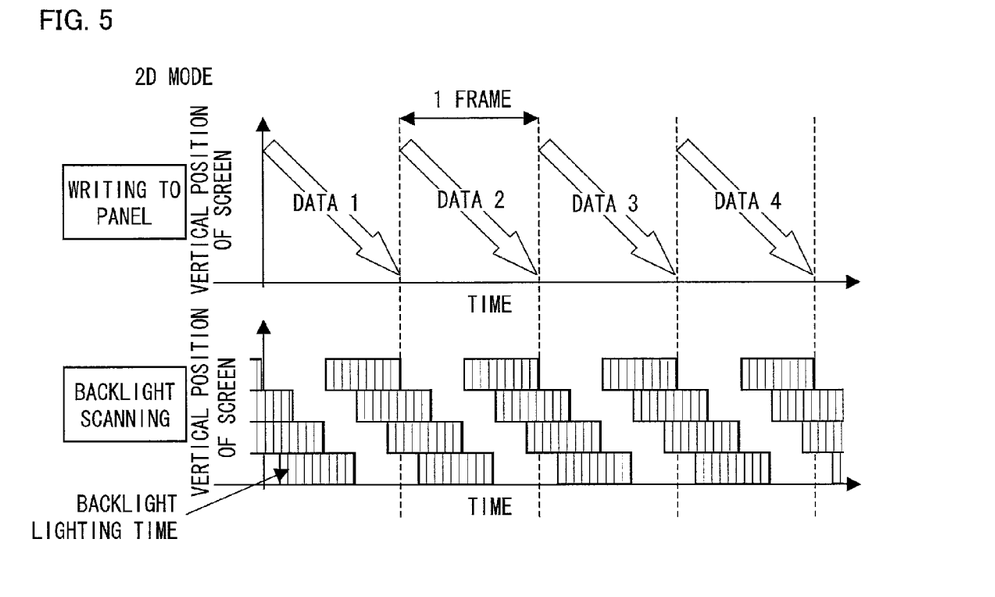
FIG. 5 is a drive timing diagram for the 2D display mode.
Figure 6:
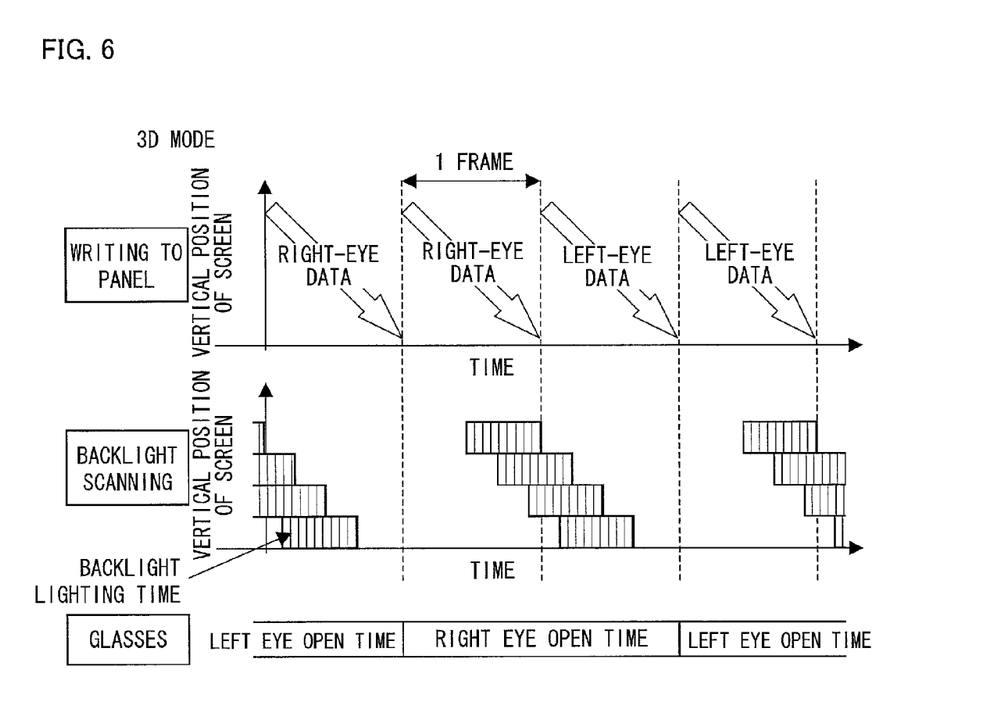
FIG. 6 is a drive timing diagram for the 3D display mode.
Figure 7:
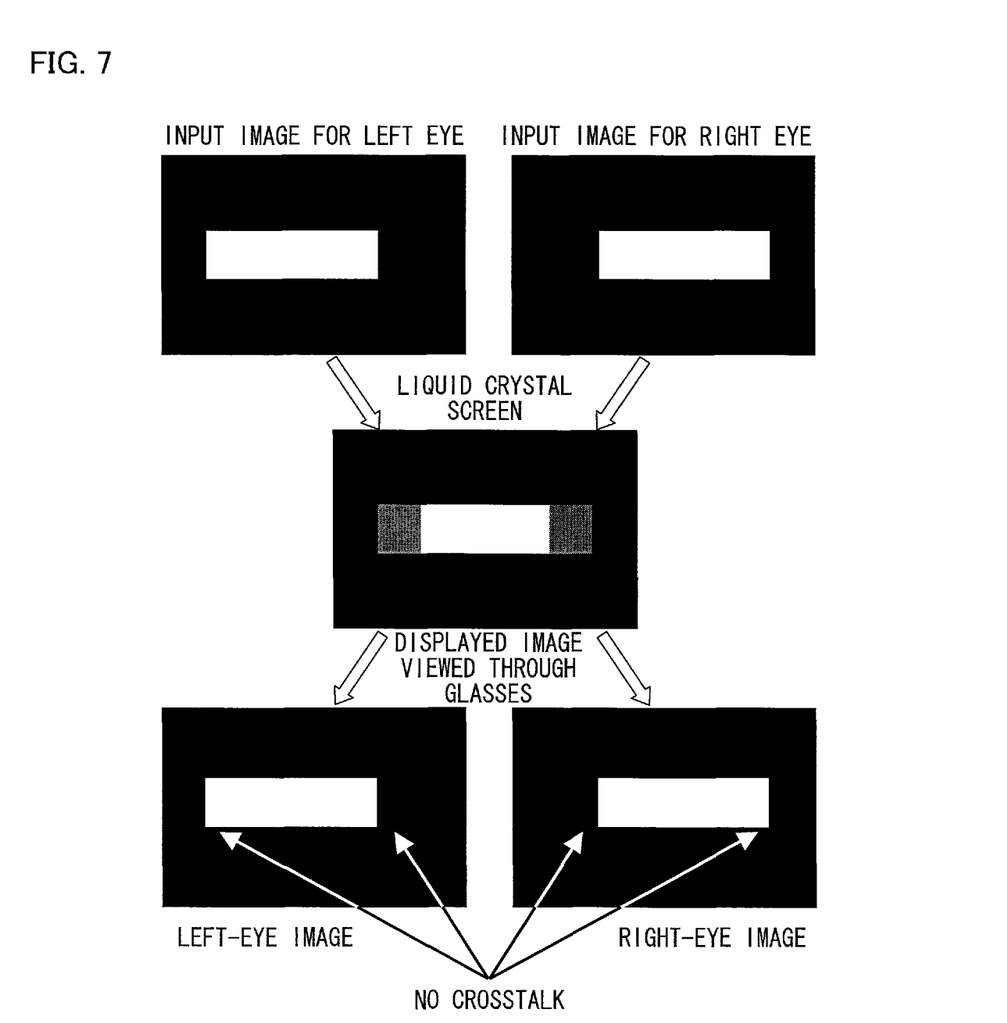
FIG. 7 is a view showing the effect during a 3D display when the liquid crystal display device shown in FIG. 1 is used.

FIG. 5 is a timing diagram for the 2D display mode. FIG. 6 is a timing diagram for the 3D display mode.

As shown in FIG. 5, in the case of the 2D display mode, video signals (data) are written to the liquid crystal panel 1 from top to bottom for every frame. In correspondence with this, backlight scanning is carried out such that light sources in the backlight 2 are sequentially turned on from top to bottom and are sequentially turned off from top to bottom after a certain period of time for every frame.

On the other hand, as shown in FIG. 6, in the 3D display mode, (i) video signals (data) for a right eye and video signals for a left eye are written two by two to the liquid crystal panel 1 and (ii) backlight scanning is carried out such that light sources in the backlight 2 are sequentially turned on from top to bottom at the time of the second writing of each video signal and are turned off after a certain period of time. That is, the backlight 2 is turned on for every other frame in the 3D display mode.

Meanwhile, the shutters of the pair of active shutter glasses are driven by the shutter driving section 18 in synchronization with the switching between the first writing of a video signal and the second writing of the video signal within a single frame. Specifically, in a single frame, (i) the shutter for a right eye of the pair of active shutter glasses is closed and the shutter for a left eye is open until completion of the first writing of a video signal for the right eye and (ii) the shutter for the left eye of the pair of active shutter glasses is closed and the shutter for the right eye is open from the start of the second writing of the video signal for the right eye.

Repeating the foregoing operations achieves a 3D display, i.e., a stereoscopic view.

Usually, in a case where a liquid crystal display device carries out a 3D display by a frame sequential method, the liquid crystal display device switches between displaying of a video for a right eye and displaying of a video for a left eye for every frame. Therefore, in an area where there is a parallax between the right and left images, liquid crystal changes every frame. Under the circumstances, if the liquid crystal is slow to respond, a desired gray level cannot be displayed. Accordingly, such an area appears as crosstalk (see FIG. 8).

Generally, a reduction in luminance on the high gray level side is less likely to be perceived. However, an increase in luminance on the low gray level side is easy to perceive especially at an edge. Therefore, such an increase is likely to cause perceivable two overlapping images.

In view of the circumstances, in order to solve the above problem by increasing the response speed of liquid crystal, overdrive is carried out. Note, however, that this causes the following problem. Since the analog gamma value is 2.2, it is not possible to obtain an accurate OD parameter on the low gray level side. This leads to an overdrive error, which causes perceivable crosstalk.

In this regard, according to the liquid crystal display device in accordance with the present embodiment, the analog gamma value for the 3D display mode is set to be deeper than 2.2 (2.9 in the present embodiment). This makes it possible to set, in small increments, the luminance values corresponding to input gray levels on the low gray level side (see (b) in FIG. 2). Accordingly, it is possible to set a desired luminance value corresponding to an input gray level, and thus possible to set an accurate OD parameter (see (b) of FIG. 4).

As such, according to the liquid crystal display device in accordance with the present embodiment, in the 3D display mode, overdrive on the low gray level side is carried out appropriately. Therefore, two overlapping images are less perceivable, and thus it is possible to improve display quality.

Note that, in a case where the analog gamma value that is to be set to 2.2 usually is set to be deeper (to be a large value), the following occurs. That is, it is possible to set, in small increments, luminance values corresponding to input gray levels on the low gray level side. This makes it possible to set a desired luminance value corresponding to an input gray level and to set an accurate OD parameter. However, on the high gray level side, it is not possible to set, in small increments, luminance values corresponding to input gray levels. This results in some errors in the luminance values corresponding to the input gray levels.

In this regard, the errors on the high gray level side are not outstanding, because videos are seen through the pair of active shutter glasses in the 3D mode. This is because, since the videos look dark when seen through the pair of active shutter glasses, the high gray level side is less outstanding.

The present embodiment described an example in which the analog gamma value for the 3D display is set to 2.9. Note, however, that the analog gamma value can be set to other values, provided that the analog gamma value is set to be deeper (larger) than the analog gamma value for the 2D display.

It is preferable that the analog gamma value for the 3D display is set to 2.9 and the analog gamma value for the 2D display is set to 2.2. Note, however, that the analog gamma value for the 3D display can be a value other than 2.9, and is preferably set to be larger than that for the 2D display.

Meanwhile, as described earlier, a liquid crystal display device of the present invention is capable of switching between a 2D (two-dimensional) display and a 3D (three-dimensional) display. Therefore, the liquid crystal display device receives a video signal for a 2D display or a video signal for a 3D display. These video signals can be stored in an information recording medium or can be in the form of carrier waves that are carried by television broadcasting waves.

A video signal stored in an information recording medium is supplied to a liquid crystal display device by playback of the information recording medium in a dedicated player. A video signal carried by television broadcasting waves is supplied to the liquid crystal display device from a tuner which receives the television broadcasting waves. Note that the video signals can be supplied to the liquid crystal display device by methods other than those described as above.

Figure 10:
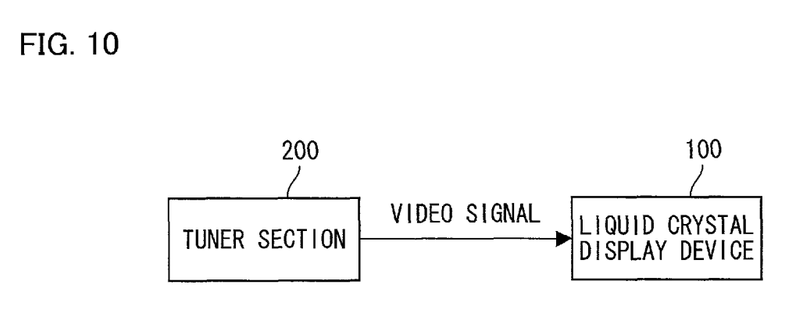
FIG. 10 is a block diagram schematically illustrating a television receiver to which a liquid crystal display device of the present invention is applied.

In a case where a liquid crystal display device is used as a display device of a television receiver, a tuner section 200 for receiving television broadcasting waves is connected to a liquid crystal display device 100 (for example see FIG. 10). Specifically, the tuner section 200 receives television broadcasting waves and supplies a video signal to the liquid crystal display device 100. Then, the liquid crystal device 100 displays an image (video) on the basis of the video signal thus supplied.

A liquid crystal display device of the present invention can be applied to, as well as a television receiver, an electronic device including a display device capable of a 3D display.

The present invention is not limited to the descriptions of the respective embodiments, but may be altered within the scope of the claims. An embodiment derived from a proper combination of technical means disclosed in different embodiments is encompassed in the technical scope of the invention.

The present invention is applicable to a liquid crystal display device which carries out a 3D display by a frame sequential method.

The invention claimed is:

1. A liquid crystal display device for carrying out a 3D display by a frame sequential method as well as carrying out a 2D display, comprising:
   a first gamma correction section for changing an input gray level to a gamma characteristic that corresponds to either the 2D display or the 3D display in accordance with a preset analog gamma value;
   a second gamma correction section for correcting a gamma characteristic so that a total gamma characteristic for the 3D display is substantially equal to a total gamma characteristic for the 2D display; and
   an overdrive circuit for finding, in accordance with a parameter set according to the gamma characteristic thus corrected by the second gamma correction section, an overdrive value corresponding to the input gray level,
   in the first gamma correction section, the analog gamma value for the 3D display being set to be larger than an analog gamma value for the 2D display.

2. The liquid crystal display device according to claim 1, wherein:
   the analog gamma value for the 3D display is set to 2.9; and
   the analog gamma value for the 2D display is set to 2.2.

3. A television receiver comprising:
   a tuner section for receiving television broadcasting; and
   a display device for displaying the television broadcasting received by the tuner section,
   the display device being a liquid crystal display device recited in claim 1.

* * * * *